United States Patent Office 3,324,151
Patented June 6, 1967

3,324,151
1-AMINO-4-ANILINO-ANTHRAQUINONE-2-SULFONIC ACIDS
Rudolf Kühne and Fritz Meininger, Frankfurt am Main, and Walter Noll, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed Apr. 6, 1965, Ser. No. 446,092
Claims priority, application Germany, Dec. 1, 1960, F 32,665
6 Claims. (Cl. 260—374)

This is a continuation-in-part application of U.S. patent application Ser. No. 155,497 filed Nov. 28, 1961, now abandoned.

The present invention relates to new anthraquinone dyestuffs and to a process for preparing them, and relates in particular to dyestuffs having the following general formula in the form of the free acids

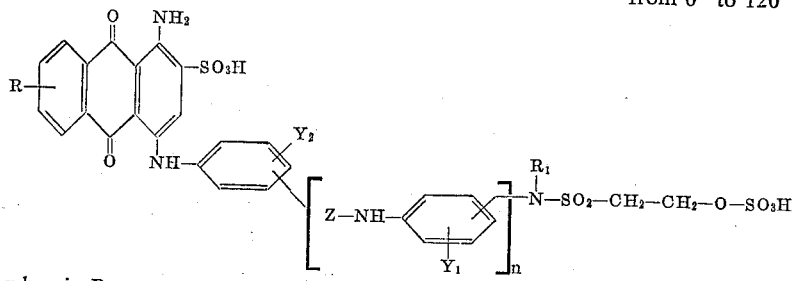

wherein R represents a hydrogen atom or a sulfonic acid group; $R_1$ represents a hydrogen atom or a lower alkyl group; $Y_1$ stands for a hydrogen atom, a lower alkyl group, a lower alkoxy group, a halogen atom or one of the groupings —$CF_3$, —$SO_3H$, —COOH and

$Y_2$ represents a hydrogen atom, a lower alkyl group, a lower alkoxy group, a carboxyl group or a halogen atom; Z stands for —C— or —$SO_2$—, and $n$ represents the numbers 0 to 1.

The new valuable anthraquinone dyestuffs can be prepared in several ways. They are obtainable by condensing anthraquinone compounds having a reactive halogen atom and groups imparting solubility in water, such as sulfonic acid groups, with N-isethionylamino-arylamines and subsequently esterifying the hydroxyl groups of the resulting condensation products, or by reacting an anthraquinone dyestuff acid halide with N-ethionyl-amino-arylamines, or by reacting an anthraquinone dyestuff acid halide with N-isethionylamino-arylamines and subsequently converting the N-isethionylamino groups into ethionylamino groups.

By N-ethionylamino-arylamines (1) and N-isethionyl-amino-arylamines (2) are to be understood compounds of the general formulae

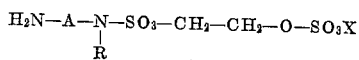 (1)

and

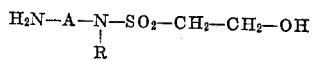 (2)

in which R represents hydrogen or lower alkyl having from 1 to 5 carbon atoms, X stands for a hydrogen or an alkali metal atom, and A represents an aryl radical, for example a phenyl radical. The aryl group A may contain substituents, for example lower alkyl groups, lower alkoxy groups, halogen atoms, such as chlorine, carboxylic acid or sulfonic acid groups.

The arylamines of the Formulae 1 and 2 can be prepared by the reaction of carbylsulfate with nitroaryl-amines, followed by catalytic reduction of the nitro-aromatic compounds obtained containing N-ethionylamino groups, and in the case of compounds (2), subsequently hydrolyzing with dilute hydrochloric acid.

The condensation of the anthraquinone compounds containing a reactive halogen atom with the amines of the composition indicated above is advantageously carried out in an aqueous or non-aqueous medium in the presence of acid-binding agents at a temperature ranging from 0° to 120° C., preferably at a temperature between 10° C. and 60° C., at a pH-value between about 4 and 9. If desired, the reaction may be carried out in the presence of organic solvents, such as acetone, methylene chloride or ethylene chloride. As acid-binding agents, the N-ethionylamino or N-isethionylamino-arylamines may be used in excess, or nitrogenous tertiary organic bases, such as pyridine or picolines, or more advantageously, inorganic compounds, such as sodium hydroxide, sodium bicarbonate, sodium carbonate, sodium acetate, potassium hydroxide, potassium bicarbonate, potassium carbonate, potassium acetate can be employed. The condensation may also be carried out in an organic solvent free from water, such as pyridine, dimethylformamide, N-methyl-acetamide, N-methyl pyrrolidone, or phosphoric acid-tris-dimethylamide, in the presence or absence of diluents, such as methylene chloride, acetone or methanol.

The compounds prepared by the process of the present invention by reacting anthraquinone compounds containing reactive halogen atoms with N-isethionylamino-arylamines can be converted into dyestuffs containing N-ethionylamino groups by esterifying the hydroxyl groups of the β-hydroxyalkylsulfonic amide radicals with sulfuric acid. The esterification of these hydroxyl groups may also be carried out by the reaction with acid salts, for example alkali metal salts of chlorosulfonic acid.

The compounds containing the reactive halogen atoms, which are used as starting materials belong to the anthraquinone series. The reactive halogen atoms may be bound in the form of sulfonic acid halide, carboxylic acid halide or directly to an aromatic nucleus of the anthraquinone molecule.

As examples of anthraquinone compounds containing active halogen atoms in the form of sulfonic acid halide groups, sulfonic acid chlorides obtained from monoarylamino anthraquinones by reaction with chloro-sulfonic acid may be mentioned. Sulfonic acid chlorides of this kind are derived, for example, from 1-amino-4-anilino-anthraquinone-2-sulfonic acid, 1-amino-4-(4′-methyl-phenylamino)-anthraquinone-2-sulfonic acid. Furthermore, there may be mentioned the following sulfonic acid chlorides: 1-amino-4-(phenylamino-3′-sulfonic acid chloride)-anthraquinone-2-sulfonic acid, 1-amino-4-(phenylamino-4′-sulfonic acid chloride)-anthraquinone-2-sulfonic acid, 1-amino-4-(3′-methylphenylamino-4′-sulfonic acid chloride)-anthraquinone - 2-sulfonic acid, 1-amino-4-(2′-carboxy-phenylamino - 5′-sulfonic acid chloride)-anthraquinone-2-sulfonic acid and 1-amino-4-(2′-methoxy-phenylamino-4′-sulfonic acid chloride)-anthraquinone-2-sulfonic acid.

As examples of anthraquinone compounds containing active halogen atoms in the form of carboxylic acid halide groups, the following compounds may be mentioned: 1-amino - 4 - (phenylamino - 2′ - carboxylic acid chloride)-anthraquinone - 2 - sulfonic acid, 1 - amino - 4 - (phenylamino - 3′ - carboxylic acid chloride) - anthraquinone - 2-sulfonic acid, 1 - amino - 4 - (phenylamino - 4′ - carboxylic acid chloride) - anthraquinone - 2 - sulfonic acid, 1 - amino - 4 - (2′ - methoxy - 5′ - carboxylic acid chloride)-anthraquinone - 2 - sulfonic acid and 1 - amino - 4 - (3′-chloro - 4′ - carboxylic acid chloride) - anthraquinone - 2-sulfonic acid.

As starting products containing reactive halogen atoms bound aromatically, there may be used for example 1-amino - 4 - bromo - anthraquinone - 2,5 - disulfonic acid, 1 - amino - 4 - bromo - anthraquinone - 2,8 - disulfonic acid or their mixtures, 1-amino-4-bromo-anthraquinone-2,6 - disulfonic acid and 1 - amino - 4 - bromo - anthraquinone-2,7-disulfonic acid and especially 1-amino-4-bromo-anthraquinone-2-sulfonic acid.

As N-ethionylamino-arylamines there may be mentioned, for example, the following compounds:

TABLE 1

4-N-methyl-N-ethionylamino-1-amino-benzene
4-N-ethyl-N-ethionylamino-1-amino-benzene
4-N-propyl-N-ethionylamino-1-amino-benzene
4-N-butyl-N-ethionylamino-1-amino-benzene
4-N-pentyl-N-ethionylamino-1-amino-benzene
4-N-methyl-N-ethionylamino-1-amino-2-methyl-benzene
4-N-methyl-N-ethionylamino-1-amino-2-methoxy-benzene
4-N-methyl-N-ethionylamino-1-amino-2-ethoxy-benzene
4-N-methyl-N-ethionylamino-1-amino-2-chloro-benzene
4-N-methyl-N-ethionylamino-1-amino-3-methyl-benzene
4-N-methyl-N-ethionylamino-1-amino-3-methoxy-benzene
4-N-methyl-N-ethionylamino-1-amino-3-chloro-benzene
4-N-methyl-N-ethionylamino-1-amino-2-trifluoro-methyl-benzene
4-N-methyl-N-ethionylamino-1-amino-2-carboxy-benzene
4-N-methyl-N-ethionylamino-1-amino-benzene-2-sulfonic acid
3-N-methyl-N-ethionylamino-1-amino-benzene
3-N-methyl-N-ethionylamino-1-amino-2-methyl-benzene
3-N-methyl-N-ethionylamino-1-amino-2-ethyl-benzene
3-N-methyl-N-ethionylamino-1-amino-2-methoxy-benzene
3-N-methyl-N-ethionylamino-1-amino-2-ethoxy-benzene
3-N-methyl-N-ethionylamino-1-amino-2-chloro-benzene
3-N-hexyl-N-ethionylamino-1-amino-benzene
3-N-methyl-N-ethionylamino-1-amino-2-carboxy-benzene
3-N-ethyl-N-ethionylamino-1-amino-2-hydroxy-benzene
3-N-methyl-N-ethionylamino-1-amino-4-methyl-benzene
3-N-methyl-N-ethionylamino-1-amino-4-methoxy-benzene
3-N-methyl-N-ethionylamino-1-amino-4-chloro-benzene
3-N-methyl-N-ethionylamino-1-amino-4,6-dimethoxy-benzene
3-N-methyl-N-ethionylamino-1-amino-4-benzene-3-sulfonic acid
2-N-methyl-N-ethionylamino-1-amino-benzene
2-N-methyl-N-ethionylamino-1-amino-4-methyl-benzene
2-N-methyl-N-ethionylamino-1-amino-4-chloro-benzene
3-N-ethyl-N-ethionylamino-4-amino-1-(4′-carboxy)-diphenylether
4-N-ethionylamino-1-amino-benzene
4-N-ethionylamino-1-amino-2-methyl-benzene
4-N-ethionylamino-1-amino-2-methoxy-benzene
4-N-ethionylamino-1-amino-2-ethoxy-benzene
4-N-ethionylamino-1-amino-2-chloro-benzene
4-N-ethionylamino-1-amino-2-trifluoro-methyl-benzene
4-N-ethionylamino-1-amino-2-carboxy-benzene
4-N-ethionylamino-1-amino-benzene-2-sulfonic acid
4-N-ethionylamino-1-amino-3-methyl-benzene
4-N-ethionylamino-1-amino-3-methoxy-benzene
4-N-ethionylamino-1-amino-3-chloro-benzene
3-N-ethionylamino-1-amino-benzene
3-N-ethionylamino-1-amino-2-methyl-benzene
3-N-ethionylamino-1-amino-2-ethyl-benzene
3-N-ethionylamino-1-amino-2-methoxy-benzene
3-N-ethionylamino-1-amino-2-ethoxy-benzene
3-N-ethionylamino-1-amino-2-chloro-benzene
3-N-ethionylamino-1-amino-2-carboxy-benzene
3-N-ethionylamino-1-amino-2-hydroxy-benzene
3-N-ethionylamino-1-amino-4-methyl-benzene
3-N-ethionylamino-1-amino-4-butoxy-benzene
3-N-ethionylamino-1-amino-4-chloro-benzene
3-N-ethionylamino-1-amino-4,6-dimethoxy-benzene
3-N-ethionylamino-1-amino-4-benzene-3-sulfonic acid
2-N-ethionylamino-1-amino-benzene
2-N-ethionylamino-1-amino-4-methyl-benzene
2-N-ethionylamino-1-amino-4-chloro-benzene
3-N-ethionylamino-4-amino-1-(4′-carboxy)-diphenylether.

As N-isethionylamino-arylamines there may be mentioned the following compounds:

TABLE 2

4-N-methyl-N-isethionylamino-1-amino-benzene
4-N-ethyl-N-isethionylamino-1-amino-benzene
4-N-propyl-N-isethionylamino-1-amino-benzene
4-N-butyl-N-isethionylamino-1-amino-benzene
4-N-pentyl-N-isethionylamino-1-amino-benzene
4-N-methyl-N-isethionylamino-1-amino-2-methyl-benzene
4-N-methyl-N-isethionylamino-1-amino-2-methoxy-benzene
4-N-methyl-N-isethionylamino-1-amino-2-ethoxy-benzene
4-N-methyl-N-isethionylamino-1-amino-2-chloro-benzene
4-N-methyl-N-isethionylamino-1-amino-3-methyl-benzene
4-N-methyl-N-isethionylamino-1-amino-3-methoxy-benzene
4-N-methyl-N-isethionylamino-1-amino-3-chloro-benzene
4-N-methyl-N-isethionylamino-1-amino-2-trifluoro-methyl-benzene
4-N-methyl-N-isethionylamino-1-amino-2-carboxy-benzene
4-N-methyl-N-isethionylamino-1-amino-benzene-2-sulfonic acid
3-N-methyl-N-isethionylamino-1-amino-benzene
3-N-methyl-N-isethionylamino-1-amino-2-methyl-benzene
3-N-methyl-N-isethionylamino-1-amino-2-ethyl-benzene
3-N-methyl-N-isethionylamino-1-amino-2-methoxy-benzene
3-N-methyl-N-isethionylamino-1-amino-2-ethoxy-benzene
3-N-methyl-N-isethionylamino-1-amino-2-chloro-benzene
3-N-hexyl-N-isethionylamino-1-amino-benzene
3-N-methyl-N-isethionylamino-1-amino-2-carboxy-benzene
3-N-ethyl-N-isethionylamino-1-amino-2-hydroxy-benzene 3-N-methyl-N-isethionylamino-1-amino-4-methyl-benzene
3-N-methyl-N-isethionylamino-1-amino-4-methoxy-benzene
3-N-methyl-N-isethionylamino-1-amino-4-chloro-benzene
3-N-methyl-N-isethionylamino-1-amino-4,6-dimethoxy-benzene
3-N-methyl-N-isethionylamino-1-amino-4-benzene-3-sulfonic acid
2-N-methyl-N-isethionylamino-1-amino-benzene
2-N-methyl-N-isethionylamino-1-amino-4-methyl-benzene
2-N-methyl-N-isethionylamino-1-amino-4-chloro-benzene
3-N-ethyl-N-isethionylamino-4-amino-1-(4'-carboxy)-diphenylether
4-N-isethionylamino-1-amino-benzene
4-N-isethinoylamino-1-amino-2-methyl-benzene
4-N-isethionylamino-1-amino-2-methoxy-benzene
4-N-isethionylamino-1-amino-2-ethoxy-benzene
4-N-isethionylamino-1-amino-2-chloro-benzene
4-N-isethionylamino-1-amino-2-trifluoromethyl-benzene
4-N-isethionylamino-1-amino-2-carboxy-benzene
4-N-isethionylamino-1-amino-benzene-2-sulfonic acid
4-N-isethionylamino-1-amino-3-methyl-benzene
4-N-isethionylamino-1-amino-3-methoxy-benzene
4-N-isethionylamino-1-amino-3-chloro-benzene
3-N-isethionylamino-1-amino-benzene
3-N-isethionylamino-1-amino-2-methyl-benzene
3-N-isethionylamino-1-amino-2-ethyl-benzene
3-N-isethionylamino-1-amino-2-methoxy-benzene
3-N-isethionylamino-1-amino-2-ethoxy-benzene
3-N-isethionylamino-1-amino-2-chloro-benzene
3-N-isethionylamino-1-amino-2-carboxy-benzene
3-N-isethionylamino-1-amino-2-hydroxy-benzene
3-N-isethionylamino-1-amino-4-methyl-benzene
3-N-isethionylamino-1-amino-4-methoxy-benzene
3-N-isethionylamino-1-amino-4-chloro-benzene
3-N-isethionylamino-1-amino-4,6-dimethoxy-benzene
3-N-isethionylamino1-amino-4-benzene-3-sulfonic acid
2-N-isethionylamino-1-amino-benzene
2-N-isethionylamino-1-amino-4-methyl-benzene
2-N-isethionylamino-1-amino-4-chloro-benzene
3-N-isethionylamino-4-amino-1-(4'-carboxy)-diphenylether.

Furthermore, there may be employed arylamines obtainable by condensation of aromatic amines containing ethionylamino groups listed in Table 1 with nitrobenzene sulfonic acid chlorides or nitrobenzoyl chlorides and subsequent reduction of the nitro group. In an analogous manner, the corresponding compounds containing isethionylamino groups are obtained by starting with the isethionylamines listed in Table 2.

As nitrobenzene-sulfonic acid chlorides for this purpose the following compounds may be mentioned:

TABLE 3

1-nitrobenzene-2-sulfonic acid chloride
1-nitrobenzene-3-sulfonic acid chloride
1-nitrobenzene-4-sulfonic acid chloride
1-nitro-2-methoxy-benzene-4-sulfonic acid chloride
1-nitro-2-methyl-benzene-4-sulfonic acid chloride
1-nitro-2-chloro-benzene-4-sulfonic acid chloride
1-nitro-2-chloro-benzene-5-sulfonic acid chloride
1-nitro-4-chloro-benzene-3-sulfonic acid chloride
1-nitro-2-methoxy-benzene-5-sulfonic acid chloride
1-nitro-2-carboxy-benzene-5-sulfonic acid chloride.

As nitrobenzoyl-chlorides used for the condensation with aromatic amines containing ethionylamino groups or isethionylamino groups listed above in Tables 1 and 2, the following compounds may be cited:

TABLE 4

2-nitro-benzoyl-chloride
3-nitro-benzoyl-chloride
4-nitro-benzoyl-chloride
3-nitro-4-methyl-benzoyl-chloride
2-nitro-4-methyl-benzoyl-chloride
4-nitro-2-methyl-benzoyl-chloride
2-nitro-5-methyl-benzoyl-chloride
2-nitro-4-chloro-benzoyl-chloride
2-nitro-5-chloro-benzoyl-chloride
3-nitro-4-chloro-benzoyl-chloride
3-nitro-6-chloro-benzoyl-chloride
4-nitro-2-chloro-benzoyl-chloride
3-nitro-4-methoxy-benzoyl-chloride
3-nitro-4-ethoxy-benzoyl-chloride
4-nitro-2-ethoxy-benzoyl-chloride Furthermore, the condensation of aromatic amines containing isethionylamino groups can be carried out with N-acylamino-sulfonic acid chlorides with subsequent hydrolysis of the acyl group. As N-acylamino-sulfonic acid chlorides, 1-acetamino-benzene-4-sulfonic acid chloride,
1-acetamino-2-carboxy-benzene-5-sulfonic acid chloride and
1-acetamino-2-carboxy-benzene-4-sulfonic acid chloride can be mentioned.

The novel dyestuffs are obtained from a neutral or weakly acid solution by concentrating the solutions and/or separating the products by the addition of precipitating agents, such as sodium chloride or potassium chloride used in the solid state or dissolved in water, and by subsequently filtering and washing. The aqueous dyestuff pastes are dried at a low temperature, preferably at a temperature between 40° C. and 50° C., if desired under reduced pressure, in order to avoid decomposition of the dyestuffs.

The products obtainable by the present invention are valuable water-soluble dyestuffs. They are suitable for dyeing and printing various materials, such as wool, silk, polyamides or polyurethanes, by the usual dyeing methods, for example from a neutral to weakly acid bath in the presence of ammonium acetate. The new dyestuffs are especially suitable for dyeing and printing materials containing cellulose, such as linen, regenerated cellulose and especially cotton. They are applied to the cellulose fibers by treating the material with an aqueous solution of the dyestuff at normal or raised temperature in the presence of an acid-binding agent, such as sodium hydroxide, sodium bicarbonate, sodium carbonate, potassium hydroxide, potassium carbonate or trisodium phosphate, or with a printing paste with the addition of an acid-binding agent, whereby the treatment with the acid-binding agent may be effected before, during or after the application of the dyestuff and by subsequently heating or steaming.

The dyeings or prints so obtained are distinguished by good fastness properties, especially by a good fastness to light and very good wet fastness properties.

The following examples serve to illustrate the invention but they are not intended to limit it thereto, the parts being by weight unless otherwise stated and the relationship of parts by weight to parts by volume being the same as that of the kilogram to the liter.

Example 1

50 parts of 1-amino-4-(phenylamino-sulfochloride) anthraquinone-2-sulfonic acid, obtainable by the reaction of 1-amino-4-phenylamino-anthraquinone-2-sulfonic acid with chlorosulfonic acid, are introduced into a solution of 35 parts of the potassium salt of 4-(N-methyl-N-ethionyl-amino)-1-aminobenzene in 300 parts by volume of water and 1 part of pyridine is added. Into the well stirred mixture dilute sodium carbonate solution is run at a temperature between 5° and 10° C. in such a manner that the pH-value is kept at 6 to 6.5. When the condensation is complete, the blue solution of the dyestuff obtained is filtered and potassium chloride is added. The product is filtered off, washed with potassium chloride solution and dried in vacuo at 40° C. A blue powder is obtained which dyes wool, silk and cotton in blue tints having a very good fastness to washing.

Similar dyestuffs which also yield blue dyeings of the same good fastness to washing are obtained by using instead of the potassium salt of 4-(N-methyl-N-ethionyl-amino)-1-aminobenzene the corresponding molar amounts of the N-ethionylamino-arylamines listed in Table 1 in the form of their potassium salts.

*Example 2*

25.5 parts of 1-amino-4-(3'-methylphenylamino-sulfonic acid chloride)-anthraquinone-2-sulfonic acid are pasted up with 300 parts by volume of water and 17.5 parts of the potassium salt of 3-(N-methyl-N-ethionaylamino)-1-aminobenzene are added. Then 2.5 parts by volume of pyridine are introduced into the reaction mixture and, subsequently, dilute sodium carbonate solution until the condensation is complete at the pH-value of 6. The reaction product is then isolated as described in Example 1 and dried. The dyestuff is readily soluble in water to give a blue solution. It dyes silk and cotton in clear blue tints having a very good fastness to washing.

Dyestuffs which possess similar properties can be obtained by using instead of the potassium salt of 3-(N-methyl - N - ethionylamino)-1-aminobenzene, the corresponding molar amounts of the N-ethionylamino-arylamines listed in Table 1 in the form of their potassium salts.

*Example 3*

19.1 parts of 1-amino-4-bromoanthraquinone-2-sulfonic acid, 12 parts of 4-(N-methyl-N-isethionylamino)-1-aminobenzene, 12.6 parts of sodium bicarbonate, 0.6 part of cuprous chloride and 0.2 part of copper powder are introduced into 150 parts by volume of water and stirred at 65° C. while excluding air. When the condensation is complete, the mixture is allowed to cool and the separated condensation product is filtered off. It is recrystallized from water, isolated and dried. For the conversion into the sulfuric acid ester the blue dyestuff powder so obtained is introduced at a temperature between 5° and 10° C. into 250 parts of concentrated sulfuric acid and stirred for two hours at this temperature until it has completely dissolved. This solution is poured onto 750 parts of crushed ice. The precipitated ester-dyestuff is isolated by filtration and then mixed in an aqueous suspension with sodium carbonate, until a pH-value of 5 is obtained. From the dyestuff solution obtained the product is salted out with potassium chloride, filtered off and dried in vacuo at 60° C. A blue powder is obtained which dissolves in water to give a blue solution and dyes wool in a neutral or weakly acid bath giving blue tints having a very good fastness to light and washing. On cotton there are also obtained clear blue dyeings or prints possessing very good fastness properties.

Dyestuffs having the same good fastness properties are obtained by reacting in a similar manner 1-amino-4-bromo-anthraquinone-2-sulfonic acid with the corresponding molar amounts of the N-isethionylamino-arylamines listed above in Table 2, specifically including 3-N-methyl-N-isethionylamino-1-amino-benzene disclosed therein, and subsequently treating the obtained condensation products with concentrated sulfuric acid. The tints on cotton or wool range from blue to green.

*Example 4*

25.9 parts of a dyestuff obtained by condensing 1-amino - 4-bromo-anthraquinone-2-sulfonic acid with 2-amino-4-sulfo-benzoic acid are introduced at a temperature between 20° and 25° C. into 250 parts of chloro-sulfonic acid and stirred for 2 hours at this temperature. The mixture is further stirred for 2 hours at a temperature between 45° C. and 50° C. and then slowly introduced into a mixture of 700 parts by volume of saturated sodium chloride solution and 500 parts of ice. The acid chloride is filtered off and washed with saturated sodium chloride solution. The moist residue is pasted up with 300 parts by volume of water and 35 parts of the potassium salt of 4-(N-methyl-N-ethionylamino)-1-amino-benzene are added at a temperature between 5° and 10° C. By addition of an aqueous potassium bicarbonate solution the pH-value is maintained at 6. When the condensation is complete, the dystuff is isolated, dissolved in hot water, filtered off and salted out with potassium chloride. It dyes wool, cotton and polyamide fibers greenish blue tints which are distinguished by a very good fastness to wet processing.

Dyestuffs which possess similar properties are obtained by using instead of the potassium salt of 4-(N-methyl-N-ethionylamino)-1-aminobenzene the corresponding molar amounts of the N-ethionylamino-arylamines listed above in Table 1.

*Example 5*

94.8 parts of the dyestuff obtained by condensing 1-amino - 4-bromo-anthraquinone-2-sulfonic acid with 1-amino-benzene-3-sulfonic acid are introduced at a temperature between 15° and 20° C. into 600 parts of chlorosulfonic acid and 200 parts of thionyl chloride are added. The mixture is stirred for 4 hours at a temperature between 18° C. and 20° C. and then poured onto a mixture of 1200 parts by volume of saturated sodium chloride solution and 2800 parts of ice. The separated acid chloride is filtered off and washed with saturated sodium chloride solution. The moist residue is pasted up with 250 parts by volume of cold saturated sodium chloride solution and introduced while stirring at a temperature between 5° and 10° C. into a suspension of 69.8 parts of the potassium salt of 4-(N-methyl-N-ethionylamino)-1-aminobenzene and 60 parts of crystallized sodium acetate in 1200 parts by volume of water. By the addition of sodium carbonate solution the pH-value is kept at 5 to 6. When the condensation is complete, the dyestuff is salted out with potassium chloride, isolated and dried in vacuo at a temperature of about 60° C. The dark blue powder dyes wool, polyamide fibers and cotton clear blue tints possessing a vrey good fastness to light and to wet processing.

In an analogous manner there can be prepared dyestuffs which possess similar properties by reacting instead of 4-(N-methyl-N-ethionylamino)-1-aminobenzene the corresponding molar amounts of the N-ethionylamino-arylamines listed above in Table 1.

*Example 6*

19.1 parts of 1 - amino - 4-bromo-anthraquinone-2-sulfonic acid, 17.5 parts of the compound 4-amino-benzoylamino - 4' - N - methyl-N-isethionylamino-benzene [obtained by the condensation of 4-nitrobenzoyl chloride with 4 - (N - methyl-N-isethionylamino)-1-aminobenzene and catalytic reduction], 15 parts of sodium bicarbonate, 2 parts of copper (1) chloride and 0.2 part of copper powder are heated with 200 parts by volume of water at a temperature of 65° C. When the condensation is complete the separated product is filtered off and washed with dilute sodium chloride solution. The dark blue condensation product is dissolved in hot water, clarified by filtration and precipitated by the aid of sodium chloride at a pH-value of 2. It is recrystallized from water and dried.

30 parts of this condensation product are introduced at a temperature between 5° and 10° C. into 300 parts of concentrated sulfuric acid and stirred for 2 hours at this temperature until they have completely dissolved. The solution is then poured onto 1000 parts of crushed ice and 100 parts of potassium chloride. The precipitated dyestuff is isolated by suction. The filter cake is suspended in cold water and neutralized to a pH-value of 5 by the addition of dilute sodium carbonate solution, salted out by potassium chloride, filtered off and dried in vacuo at a temperature of 50° C. The dark blue powder obtained dyes wool or polyamide fibers in a neutral or weakly acid bath giving blue tints possessing very good fastness to light and washing.

By condensing 4-nitrobenzoyl-chloride as the starting material with the the other N-isethionylamino-arylamines listed above in Table 2 instead of 4-(N-methyl-N-isethionylamino)-1-aminobenzene and otherwise following the directions given in Example 6, there can be obtained dyestuffs which possess similar properties.

The starting compound 4-nitrobenzoyl-chloride can also be replaced by the other nitrobenzoyl-chlorides listed above in Table 4 to yield other nitrobenzoylamino compounds. These can be converted by catalytic reduction into the corresponding aminobenzoylamino compounds which may be reacted in an analogous manner to yield dyestuffs with similar properties. The tints on wool or polyamide fibers range from blue to greenish blue.

*Example 7*

38.2 parts of 1-amino-4-bromo-anthraquinone-2-sulfonic acid, 42.9 parts of the compound of the formula

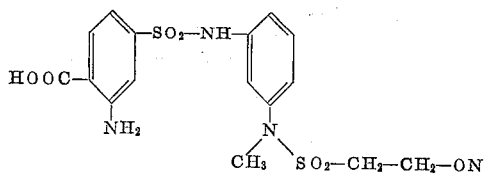

[obtained by the condensation of 1-acetamino-2-carboxy-benzene-5-sulfonic acid chloride with 3-(N-methyl-N-isethionylamino)-1-aminobenzene, followed by splitting off the acetyl group], 35 parts by volume of 3-N-potassium bicarbonate solution, 35 parts of potassium acetate and 2 parts of copper powder are heated with 200 parts by volume of water to a temperature 85° C. until the reaction has finished. The hot solution is filtered off to remove any residue. The filtrate is brought by addition of dilute hydrochloric acid to a pH-value of 2, cooled to 10° C. and the separated condensation product is filtered off. This residue is dissolved in 2 liters of water with the help of some sodium carbonate solution. By addition of dilute hydrochloric acid a pH-value of 2 is obtained. The precipitated condensation product is filtered off and washed with diluted hydrochloric acid 1:100. The residue is then dried in vacuo at 50° to 60° C.

50 parts of this condensation product are introduced at a temperature of 0° to 10° C. into 500 parts of concentrated sulfuric acid, stirred 2 hours at 5° to 10° C. until they have completely dissolved. This solution is then poured onto 1500 parts of crushed ice and 200 parts of potassium chloride. The precipitated ester-dyestuff is isolated by filtration. The residue is mixed in aqueous suspension with sodium carbonate solution until a pH-value of 5 is obtained and subsequently salted out by potassium chloride. After filtering off the dyestuff is dried in vacuo at 60° C. A dark blue powder is obtained. It dyes wool in a neutral or weakly acid bath in the presence of ammonium acetate. The greenish blue dyeings show good fastness properties. On cotton, clear greenish blue dyeings or prints possessing very good fastness properties are obtained in the presence of sodium carbonate.

Using instead of 1-amino-2-carboxy-benzene-5-sulfonic acid-(3'-N-methyl-N-isethionylamino)-anilide the corresponding molar amounts of the analogous condensation products of 1-acetamino-2-carboxy-benzene-5-sulfonic acid chloride with the isethionylamino arylamines listed above in Table 2 and reacting the so obtained condensation products (after splitting off the acetyl group) with 1-amino-4-bromoanthraquinone-2-sulfonic acid followed by esterification with concentrated sulfuric acid in an analogous manner, there are obtained dyestuffs which possess similar properties.

Replacing the starting compound 1-acetamino-2-carboxy benzene-5-sulfonic acid chloride by 1-acetamino-2-esterification with concentrated sulfuric acid in an analogous manner, there are obtained dyestuffs which possess similar properties.

*Example 8*

46.2 parts of 1-amino-4-bromo-anthraquinone-2,5-disulfonic acid, 25.5 parts of 4-(N-methyl-N-isethionylamino)-1-aminobenzene, 25 parts of sodium bicarbonate, 3 parts of cooper (1) chloride and 0.3 part of copper powder in 400 parts by volume of water are heated to 60° C., while excluding air, for several hours until the condensation has finished. The resulting blue solution is filtered off from the copper residue and the condensation product is precipitated by potassium chloride, filtered off, washed with potassium chloride solution and dried.

50 parts of this condensation product are introduced at a temperature between 5° and 10° C. into 500 parts of concentrated sulfuric acid and stirred for 2 hours at 5° C., until all has completely dissolved. The solution is poured onto 1600 parts of crushed ice and the dyestuff is precipitated by potassium chloride. It is isolated by suction, pasted up with potassium chloride solution and the pH value is adjusted to 5 by addition of potassium carbonate. The dyestuff is filtered off and dried in vacuo at about 60° C. A dark blue powder is obtained, readily soluble in water to give a greenish blue solution. It dyes wool or polyamide fibers from neutral or weakly acid baths greenish blue tints possessing very good fastness to light and wet processing. On cotton or regenerated cellulose fibers, in the presence of sodium bicarbonate or sodium carbonate, greenish blue dyeings or prints showing very good fastness properties are obtained.

By replacing 1-amino-4-bromo-anthraquinone-2,5-disulfonic acid by 1-amino-4-bromo-2,8-disulfonic acid or a mixture of both components dyestuffs of similar properties can be obtained.

Instead of 4-(N-methyl-N-isethionylamino)-1-aminobenzene there can be used the corresponding molar amounts of the compounds listed in Table 2. By working in a similar manner there are obtained dyestuffs which possess similar properties. The tints on wool or cotton range from blue to green.

*Example 9*

38.2 parts of 1-amino-4-bromo-anthraquinone-2-sulfonic acid, 41.5 parts of the compound of the formula

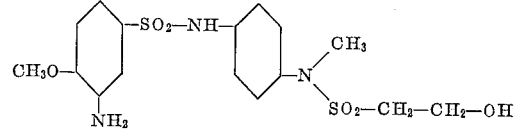

[obtainable by the condensation of 1-nitro-2-methoxybenzene-5-sulfonic acid chloride with 4-(N-methyl-N-isethionylamino)-1-aminobenzene and subsequent reduction of the nitro group] 33 parts of sodium bicarbonate, 3 parts of copper-(1)-chloride and 0.3 part of copper powder are suspended in 450 parts by volume of water and stirred at a temperature of 65° C., while air is excluded, until the condensation has finished. The resulting suspension is filtered off and the residue is washed with dilute sodium chloride solution. The remaining residue is then dissolved in hot water. The solution so obtained is clarified and the dyestuff salted out with sodium chloride. The precipitated condensation product is washed with dilute sodium chloride solution and dried in vacuo at 60° C.

30 parts of this condensation product are introduced at a temperature between 0° and 10° C. into 300 parts of concentrated sulfuric acid and stirred for two hours at 5° to 10° C., until the product has dissolved. This solution is poured onto 900 parts of crushed ice. The precipitated ester-dyestuff is isolated by filtration and then pasted up with ice water and neutralized to a pH-value of 6 by addition of sodium carbonate solution. After precipitation by sodium chloride the dyestuff is filtered off and dried in vacuo at 60° C. The dark blue powder is soluble in water. It dyes wool or polyamide fibers from neutral to weakly acid baths blue tints possessing very good fastness to light and wet processing. On cotton or regenerated cellulose, in the presence of sodium bicarbonate or sodium carbonate, blue dyeings or prints having very good fastness properties are obtained.

Instead of 1-amino-2-methoxy-benzene-5-sulfonic acid-(4'-N-methyl-N-isethionylamino)-anilide, corresponding molar amounts of the analogous condensation products of 1-nitro-2-methoxy-benzene-5-sulfonic acid chloride with another isethionylamino arylamine listed above in Table 2 can be used, after reduction of the nitro group for the condensation with 1-amino-4-bromo-anthraquinone-2-sulfonic acid and esterification of the condensation product with concentrated sulfuric acid, to give dyestuffs which possess similar properties.

By replacing the starting compound 1-amino-2-methoxy-benzene-5-sulfonic acid chloride with another nitrobenzene sulfonic acid chloride listed above in Table 3, blue dyestuffs which possess similar properties can be obtained.

We claim:
1. Anthraquinone dyestuffs of the formula

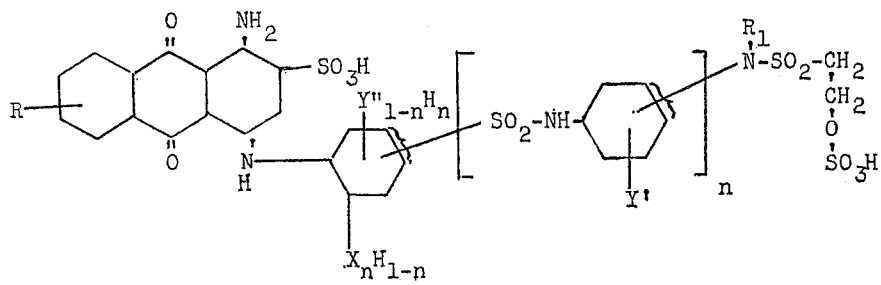

wherein R is hydrogen or —SO$_3$H, R$_1$ is hydrogen or —CH$_3$, Y' and Y" are hydrogen, chlorine, —CH$_3$, or —OCH$_3$, X is hydrogen, —OCH$_3$, or —COOH, and $n$ is 0 or 1, said dyestuffs containing at most three free acid groups.

2. The dyestuff of the formula

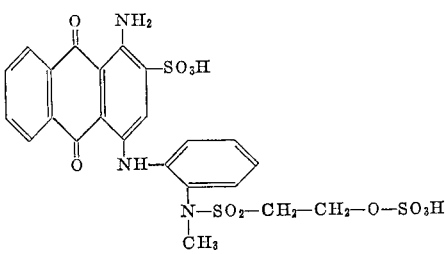

3. The dyestuff of the formula

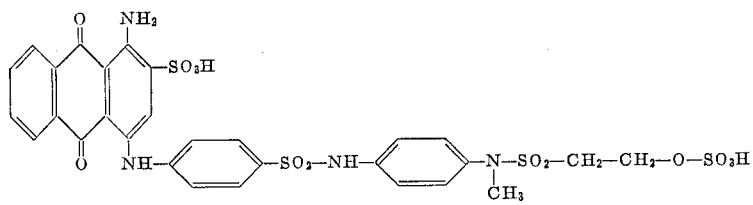

4. The dyestuff of the formula

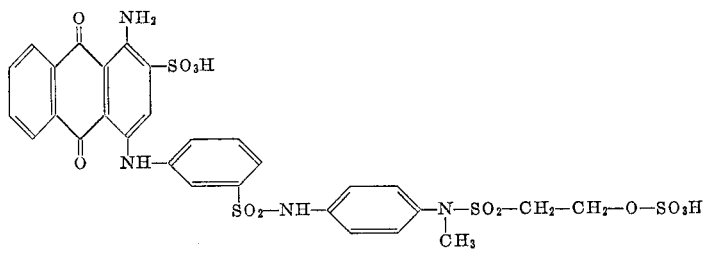

5. The dyestuff of the formula

6. The dyestuff of the formula
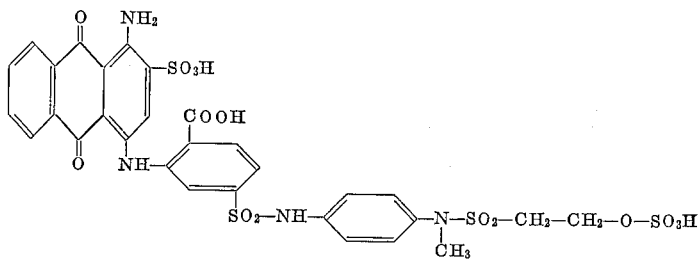
References Cited
UNITED STATES PATENTS
| | | | |
|---|---|---|---|
| 3,070,610 | 12/1962 | Buehler | 260—372 |
| 3,097,216 | 7/1963 | Heyna et al. | 260—372 |
| 3,114,746 | 12/1963 | Benz et al. | 260—372 X |
LORRAINE A. WEINBERGER, *Primary Examiner.*
RICHARDSON K. JACKSON, *Examiner.*
H. C. WEGNER, *Assistant Examiner.*